United States Patent [19]
Mancuso et al.

[11] Patent Number: 5,870,495
[45] Date of Patent: Feb. 9, 1999

[54] FUZZY METHOD AND DEVICE FOR THE RECOGNITION OF GEOMETRIC SHAPES IN IMAGES

[75] Inventors: Massimo Mancuso, Monza; Paolo Moretti, Genoa; Rinaldo Poluzzi, Milan; Gianguido Rizzotto, Civate, all of Italy

[73] Assignee: SGS-Thomson Microelectronics S.r.l., Agrate Brianza, Italy

[21] Appl. No.: 584,529

[22] Filed: Jan. 11, 1996

[30] Foreign Application Priority Data

Jan. 13, 1995 [EP] European Pat. Off. ........... 95830002.2

[51] Int. Cl.$^6$ ....................................................... G06K 9/46
[52] U.S. Cl. ............................................ 382/199; 382/203
[58] Field of Search .................................... 382/199, 155, 382/160, 201, 203; 395/3, 142

[56] References Cited

U.S. PATENT DOCUMENTS

| | | | |
|---|---|---|---|
| 5,142,592 | 8/1992 | Moler | 382/199 |
| 5,339,367 | 8/1994 | Roth | 382/199 |
| 5,515,453 | 5/1996 | Hennessey et al. | 382/141 |

OTHER PUBLICATIONS

Kang et al., "Perceptual grouping based on fuzzy sets", IEEE, 1992.

Russo, F., "A new class of fuzzy operators for image processing: design and implementation", IEEE, 1993.

European Search Report from European Patent Application 95830002.2, filed Jan. 13, 1995.

Pattern Recognition Letters, vol. 15, No. 7, Jul. 1994 Amsterdam, NL, pp. 649–658, T. Poston, et al., "Fuzzy Hough Transform".

Int. Conf. On Acoustics, Speech and Signal Processing, vol. 3, Apr. 14, 1983 Boston, MA, USA, pp. 1220–1223, I. Paul ET J.W. Woods, "Some Experimental Results in Adaptative Prediction DPCM Coding Of Images".

Optical Engineering, Jun. 1994, USA, vol. 33, No. 6, ISSN 0091–3286, pp. 2079–2082, Hong Kyu Chung, et al., "Orientation and Position Detection Of Surface–Mounted Devices and Printed Circuit Boards Using The High–Precision Fuzzy Hough Transform".

IEEE Trans. On Systems, Man, And Cybernetics, vol. 24, No. 5, May 1994, pp. 745–759, S M Bhandarkar "A Fuzzy Probabilistic Model For the Generalized Hough Transform".

*Primary Examiner*—Jon Chang
*Attorney, Agent, or Firm*—Wolf, Greenfield & Sacks, P.C.

[57] ABSTRACT

A method for recognizing geometric shapes in an image using fuzzy logic. The method includes determining an edge in the image and a gradient of the edge. The gradient is corrected by virtue of a first fuzzy logic process, and the number of points that belong to the curve are determined by virtue of a second fuzzy logic process. A fuzzy device for the recognition of geometric shapes in images that implementing the method includes an edge detector, a fuzzy gradient corrector to correct the gradient, and a fuzzy vote attributor to determine the number of points that belong to the curve.

33 Claims, 6 Drawing Sheets

FUZZY METHOD AND DEVICE FOR THE RECOGNITION OF GEOMETRIC SHAPES IN IMAGES

BACKGROUND OF THE INVENTION

1. Field of the Invention

The present invention relates to a fuzzy method and device for the recognition of geometric shapes in images. The fields of application of this method and of this device range from automatic guidance and navigation systems to image understanding systems.

2. Discussion of the Related Art

The primary goal of vision systems is to recognize objects in an image. However, before the object can be recognized it is necessary to recognize the characteristic lines that compose it and provide a symbolic representation of the object. One way to achieve these goals is to use the Hough transform, which is capable of performing a mapping from structures of the feature space to structures of an appropriate parameter space.

Straight lines can be considered as an example of this Hough transform also because they are undoubtedly the lines that most frequently occur in the description of the shape of objects. It is thus evident that providing a method capable of identifying and describing these lines, which so often compose an object, is extremely important.

The Hough transform, introduced in 1962, was in fact developed to solve this problem and generalized only at a later time so as to consider other types of parameter lines.

Consider a point that has the coordinates $(x_i, y_i)$ and belongs to a generic straight line defined by the equation y=ax+b. It is evident that an infinite number of lines pass through this point; however, all such straight lines must satisfy the equation $y_i$=ax+b for different values of a and b.

Therefore, by writing this last equation in the form $b=y_i-ax_i$ and considering the plane ab (parameter plane) it is possible to obtain the equation of a single straight line at a point having preset coordinates.

The same line of reasoning can of course be followed for another point that has the coordinates $(x_j, y_j)$; a new straight line associated with this point will be obtained in the parameter space. The intersection of the two straight lines generated in the parameter plane allows one to obtain the parametric coordinates (a,b) of the straight line that connects the two points of the feature plane. FIGS. 1A and 1B illustrate this graphically.

The parametric equation for straight lines proposed above has some severe drawbacks: even for limited portions of the feature space, the domain of values of both parameters a and b can be the entire set of real numbers (for example, in vertical straight lines a=∞).

In order to obviate this drawback, the following representation is usually adopted instead:

$$p = X \cos\theta + \sin\theta$$

where p is the distance of the straight line from the origin and θ is the angle formed by the axis x and by the normal to the straight line, as shown in FIG. 2.

By using this representation, each point of the feature space is matched by a sinusoid in the parameter space. Clearly the parameter space is limited, since p is within the range $[-R\sqrt{2}, R\sqrt{2}]$ for images with a linear dimension R and θ can be limited between 0° and 180°, since 180° translations in θ and an optional reversal of sign in p allow to return to the range [0°, 180°].

Accordingly, if one has a set of n points [(X1, X2), ... ,(Xn,Yn)] that belong to a given straight line in the feature plane and one wishes to determine the parameters that describe this straight line, it is necessary to transform the points (Xi, Yi) into sinusoidal curves in the plane p-θ, which are described by p=Xi cosθ+Yi sinθ, and to note that these curves all intersect at the parametric values of the straight line being sought, as shown in FIGS. 3A and 3B. In other words, by transforming co-linear pixels in the feature plane one obtains several sinusoids that intersect in a single point that has the coordinates $(\theta_0, p_0)$ and corresponds to the straight line on which said points lie. Accordingly, the problem of finding collinear points in the feature can be converted into the problem of finding concurrent curves.

The computational advantage of the Hough transform arises from dividing the parameter space into cells, that is to say, from introducing an acceptable error in p and θ in the quantization of the parameters in a grid. Quantization can be reduced to the region $0 \leq \theta \leq \pi$ and $-R \leq p \leq R$, where R is the maximum distance that a point of the feature plane can have from the center of the image (in practice, half of a diagonal). The quantized region can thus be reduced to a two-dimensional array of accumulators. For each point (Xi, Yi) in the feature plane, the corresponding curve is mapped onto the array, increasing the accumulator in each cell that lies along the curve. Accordingly, each cell of the parameter space stores the number of curves that have passed through it, minus the noise and the discretization that is carried out.

After transforming all the points of the edge, the problem is to find the local maximums in the array of accumulators. These local maximums must be higher than a certain threshold in order to extract only lines that are long enough, and most of all in order to eliminate noise (false maximums). It is therefore necessary to find a threshold that varies in each situation in the most intelligent possible manner according to the image to be analyzed.

After extracting the local maximums from the array of accumulators it is possible to draw the lines that they have generated. In other words, the inverse transform is applied, reconstructing the corresponding straight line for each maximum point (θ, p) by using the following equation:

$$Y_i = \frac{P}{\sin\theta} - X_i \frac{\cos\theta}{\sin\theta}$$

It should be noted that the Hough transform can also be used for other geometric shapes, such as curves, circles, etcetera.

However, the transformation performed with the Hough transform is sensitive to the noise that is present in the image and depends on the performance of the edge detection system that is used. Another problem in the use of the Hough transform is the recovery of points lost due to discretizations and noise.

A problem of vision systems in general is processing speed. Known systems have a very high level of processing complexity and have processing speeds that are not satisfactory for the required applications, (for example, theoretically real-time processing). Another problem of known vision systems is the complexity of the hardware.

SUMMARY OF THE INVENTION

Accordingly, an aim of the present invention is to provide a fuzzy method and device for the recognition of geometric shapes in images that gives greater robustness to the standard Hough transform. Within the scope of the above aim, an object of the present invention is to provide a device that is less complex than known systems. Another object of the present invention is to provide a method and a device that allow faster processing than known systems, theoretically in real time.

This aim, these objects, and others which will become apparent hereinafter are achieved by a fuzzy method for the recognition of geometric shapes in images, comprising the following steps: detection of at least one edge of a curve of an image; recognition of the gradient of said edge; correction of said gradient by virtue of first fuzzy means; and determination of the number of points that belong to said curve by virtue of second fuzzy means.

According to an illustrative embodiment of present invention, the method is performed by a fuzzy device that recognizes geometric shapes in images, comprising an edge detector, adapted to detect at least one edge of a curve of an image and to recognize the gradient of said edge; a fuzzy gradient corrector, adapted to correct said gradient; and a fuzzy vote attributor, adapted to determine the number of points that belong to said curve.

BRIEF DESCRIPTION OF THE DRAWINGS

The characteristics and advantages of the present invention will become apparent from the description of a preferred but not exclusive embodiment, illustrated only by way of non-limitative example in the accompanying wherein.

DETAILED DESCRIPTION

Figure 1A:
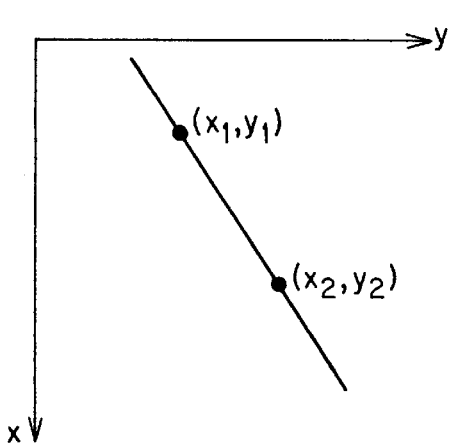
FIGS. 1A and 1B are graphical representations of a normal parameterization of a straight line.
Figure 1B:
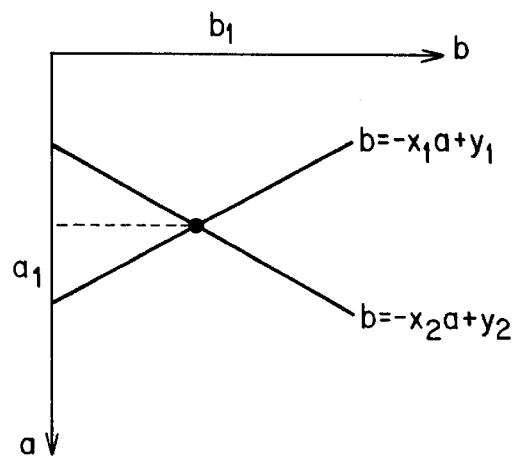
Figure 2:
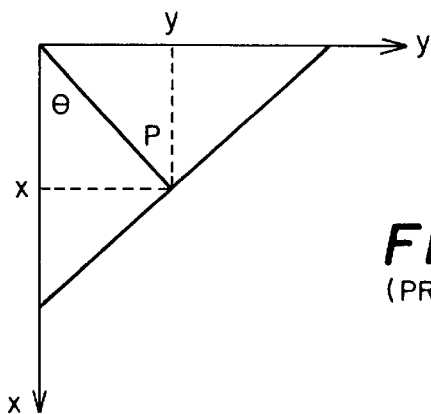
FIG. 2 is a graphical representation of a normal parameterization of a straight line with polar coordinates.
Figure 3A:
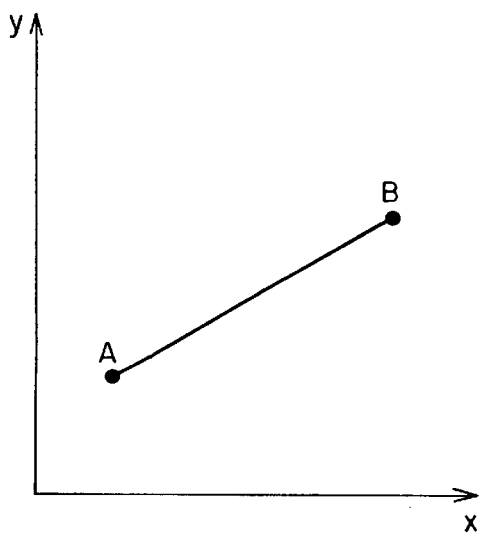
FIGS. 3A and 3B are plots of a quantization of the parameters p and θ of FIG. 2.
Figure 3B:
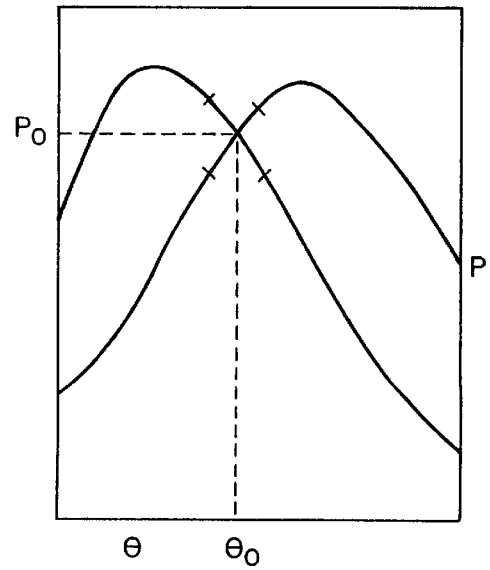
Figure 4:
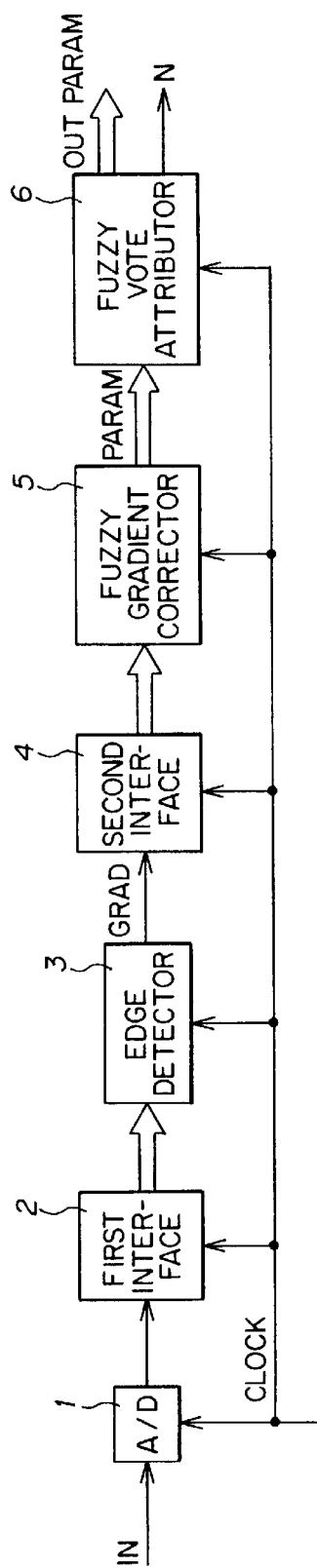
FIG. 4 is a block diagram of a device according to the present invention.

With reference to FIG. 4, a device according to the present invention comprises an A/D converter 1 adapted to sample the image signal IN and convert it into a sequence of digital data. The image signal is scanned by consecutive lines (raster scanning). The AID converter 1 is not necessary if the image signal IN is already in digital form.

The output of the A/D converter 1 is connected to a first interface 2 comprising memory elements that are adapted to create image portions, defined as sub-images.

The output of the first interface 2, that is to say, the pixels of the sub-images, is input to an edge detector 3 that is adapted to detect the edges that are present in said sub-images. The size of said sub-images depends on the type of edge detector that is used. An important aspect of the present invention is that the output of the edge detector 3 is determined by information on the gradient GRAD at the identified edge. This allows fewer calculations than the standard Hough transform.

The data on the gradient GRAD is sent to a second interface 4, which also comprises a number of memory elements, the number depending on the particular implementation of the system. The second interface is adapted to select a portion of the GRAD gradient image that is associated with the input image IN.

Said image portion is the input of a fuzzy gradient corrector 5. Said corrector 5 is adapted to make fuzzy inferences starting from the structure of the data in the neighborhood of the edge point to be classified, and is capable of correcting a stream of data affected by the intrinsic inaccuracy of the edge detector 3 and by noise. The fuzzy gradient corrector 5 produces as output the parameters PARAM related to the parametric representation of the curve being sought, after establishing a reference system within the feature plane.

The parameters PARAM are then sent to a fuzzy vote attributor 6 adapted to determine the number of points that belong to a given curve. The output of the fuzzy vote attributor 6 comprises the parameters OUTPARAM that characterize the curve and the number of points N belonging thereto.

Finally, all the blocks that compose the device are synchronized by a clock 7 that is adapted to generate a timing signal CLOCK.

Figure 5:
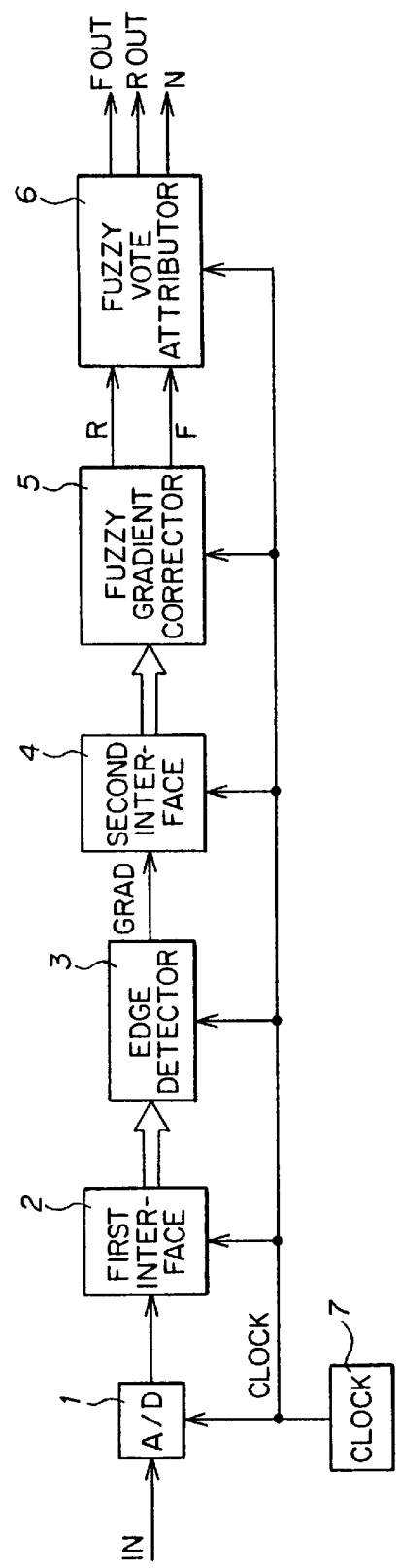
FIG. 5 is a block diagram of a device according to an embodiment of the present invention, adapted for recognizing geometric shapes formed by line segments.

A simple embodiment of a device according to the present invention is one adapted to identify straight lines, line segments, and geometric shapes formed by line segments, and is shown in FIG. 5. In this case, the parameters PARAM related to the parametric representation of the straight line are the radius R and the phase F, if a polar coordinate system is used, and are generated by the fuzzy gradient corrector 5.

The fuzzy vote attributor 6 generates the output of the device, that includes the line segment (determined by $R_{out}$ and $F_{out}$) and the length N thereof.

With reference to this implementation of the device according to the present invention, the internal architecture of each block will now be elaborated.

The A/D converter 1 will not be explained in detail, since it is assumed to be known.

Figure 6:
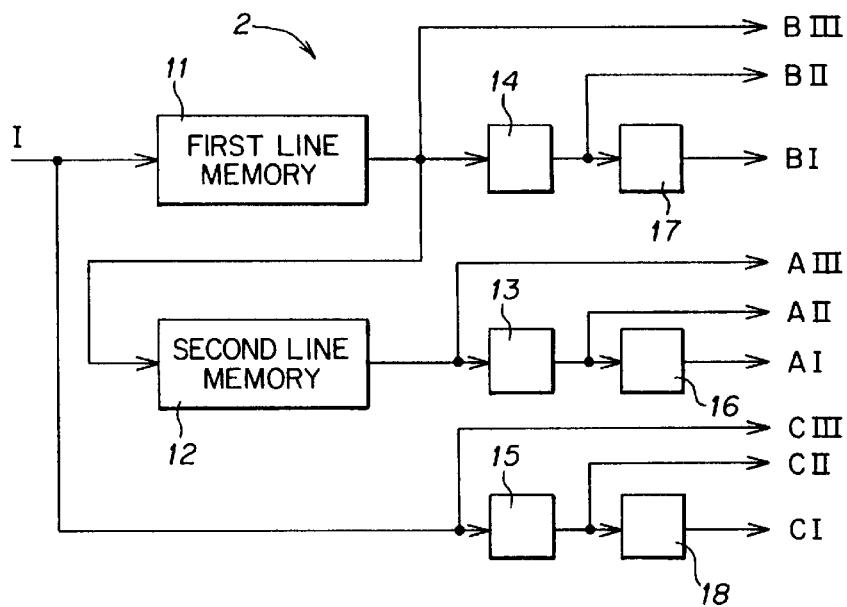
FIG. 6 is a block diagram of the interfaces of a device according to an embodiment of the present invention.

The first interface 2 comprises a plurality of line and pixel memory elements. In the particular case of a 3×3 work window required by the edge detector 3, the architecture of the interface 2 is shown in FIG. 6.

Assume that the 3×3 window is designated by columns A, B, and C, and that the rows of the window are designated by I, II, and III. In a raster scan, the pixels are sent to the input I of the interface 2 in the following sequence: AI, BI, CI, AII, BII, CII, AIII, BIII, and CIII. The first pixel AI is stored in the first line memory 11. Then said pixel is transferred to the second line memory 12, while the subsequent pixel BI is stored in the first line memory 11. When the third pixel CI is sent, the first three pixels AI, BI, and CI are transferred into the respective first delay memories 13, 14, and 15. This sequence is then repeated with the second three pixels AII, BII, and CII, while the first three pixels are transferred into the respective second delay memories 16, 17, and 18. When the third three pixels AIII, BIII, and CIII are sent, the outputs of the interface 2 are as shown in FIG. 6.

The window [AI..CIII] is sent to the edge detector 3. The edge detector 3 divides an image into uniform regions according to any principle and separates these regions with lines that form their borders. The edge detector reliably identifies these borders, known as edges. As a first hypothesis, one may consider an image as a continuous function with two variables that establishes a relationship between each point in the plane and a third value, which is generally light intensity.

Seeking the edges of regions therefore entails identifying the areas where this function varies more rapidly, that is to say, where the value of the derivative is higher. Indeed because of this fact, one of the categories of segmentation methods is known in the literature as "differential operators". It can in fact be easily demonstrated that in one dimension, the first derivative is a simple and fast method for pointing out sudden transitions of a function.

In order to locate the exact point that separates two regions, one proposed method consists of making said point coincide with the zero value of the second derivative. However, it should be noted that the differentiation operation is not robust with respect to noise. This fact means that a small variation in light intensity leads to a large value of the first derivative and correspondingly to a larger effect on the second derivative. Therefore, a threshold on the value of the first derivative is introduced in order to select only significant transitions.

The above described situation for single-variable functions can obviously be applied to the two-dimensional case without significant variations: in the two-dimensional case, the gradient and the second derivative of the intensity function, calculated in the direction of the gradient, are considered. However, images are discrete functions, not continuous functions, and therefore it is necessary to perform appropriate approximations of the differential operators; these approximations are produced by means of discrete convolutions with appropriate masks. These masks differ in terms of dimension and weight, but they are all based on an approximation of the incremental ratio:

$$\frac{df(x)}{dx} = \frac{f(x+h) - f(x-h)}{2h}$$

The partial derivative (in the direction x or y) calculated at one point, however, is obtained from a weighted average of a set of incremental ratios in order to limit the noise that is assumed to be present, especially in the frequency spectrum part of the signal being processed. A mask (window) measuring 3×3 has been used in the present case, and this has resulted in good approximations of the gradient without excessively affecting the computation time. The following operators are used (they are Sobel operators, but others may be used):

| $f_y$ | | | | $f_x$ | | |
|---|---|---|---|---|---|---|
| 1 | 2 | 1 | | −1 | 0 | 1 |
| 0 | 0 | 0 | | −2 | 0 | 2 |
| −1 | −2 | −1 | | −1 | 0 | 1 |

Regardless of the operator that is used, the modulus of the gradient is calculated by means of the formula:

$$|f| = \sqrt{(f^2_x + f^2_y)}$$

This formula, too, is computationally intensive and is therefore approximated as follows:

$$|f| = |f_x| + |f_y|$$

Actually, since the use of a single threshold has been shown to generate jagged edges, consideration was given to using a heuristically-defined threshold in the algorithm. Ultimately, a solution of hysteresis thresholding was adopted:
- if the weight of an edge point is greater than the upper threshold, the point is considered valid;
- if instead the weight of an edge point is smaller than the upper threshold and greater than the lower threshold, the point is considered valid only if at least one of the neighboring points fits the previous case; otherwise the edge point is discarded.

When the pixel is classified as an edge pixel, the gradient GRAD is calculated as:

$$GRAD = \arctan \frac{f_y}{f_x}$$

Alternatively, it is possible to use the Canny algorithm, which filters the image with a Gaussian derivative operator and detects the edges that are present by detecting the gradient maximums. It is important to filter the image with a low-pass filter, since differentiation is highly noise-sensitive.

The Canny recognition algorithm, too, in addition to the edge detection step, includes a post-processing procedure which consists of hysteresis thresholding.

Both the Sobel and the Canny recognition methods have positive and negative aspects, and therefore one method or the other is chosen according to the characteristics of the images to be analyzed. The Sobel algorithm is very fast, due to its considerable structural simplicity, but its behavior is not very reliable in the case of particularly complex and noisy images. In contrast, the Canny algorithm combines lower processing speed with good reliability as to the existence of the detected edge and accurate localization (meaning that the points of the image that the detection operator determines are very close to the real edge).

The value of the gradient GRAD thus determined by means of one of these two algorithms, or in any other manner, is sent to the second interface 4, which selects a portion of the gradient image associated with the input image.

The structure of the second interface 4 is identical to the structure of the first interface 2 and will not be explained in detail, since there may be a different number of memory elements depending on the size of the mask. It is assumed to be 3×3 by way of example.

Figure 7:
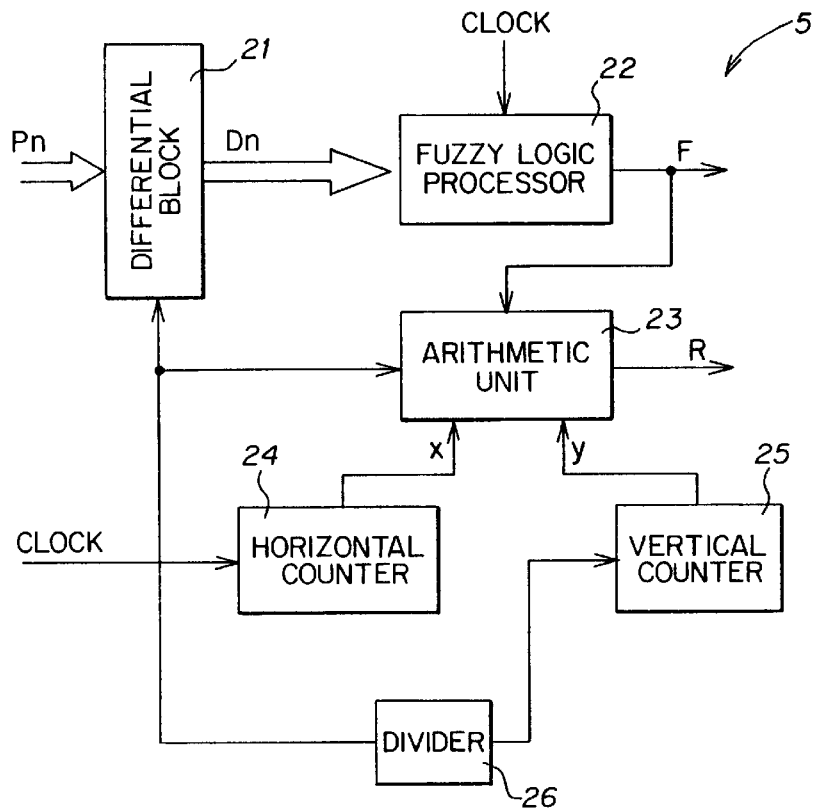
FIG. 7 is a block diagram of a fuzzy gradient corrector.

The portion of the gradient image is sent to the fuzzy gradient corrector 5 shown in FIG. 7. The corrector 5 comprises a differential block 21 that receives as input the 3×3 window of the gradient image from the second interface 4. The differential block 21 is adapted to calculate the differences between the gradient at the central point of the window being used and the neighboring pixels inside said window. The 3×3 mask as shown in FIG. 9 has been used for this purpose.

Figures 9A, 9B:
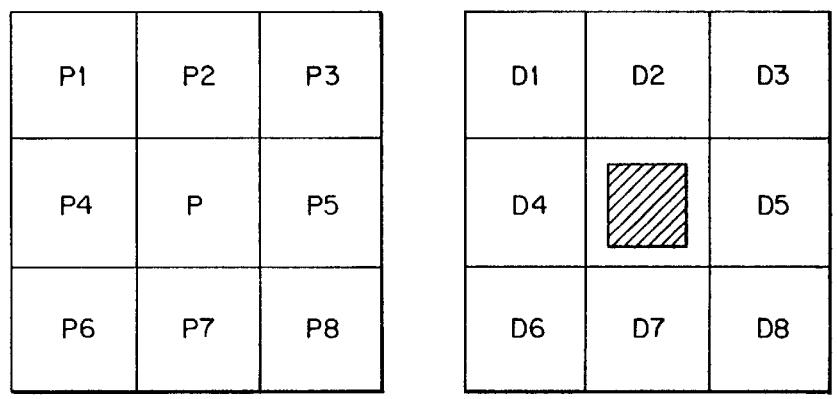
FIGS. 9A and 9B are graphical representations of a mask used to correct the gradient.

The reference symbols P1, P2, . . . , P8 designate the pixels in the positions shown in FIGS. 9A and 9B, the values of the gradient at each one of these points are obtained. These values are used to obtain the differences D1, D2, . . . , D8 between the central pixel and the gradient in the n-th position.

These differences Dn are sent to fuzzy means 22, that makes inferences on these differences, so as to determine the correct value of the gradient (or phase).

Figure 10A:
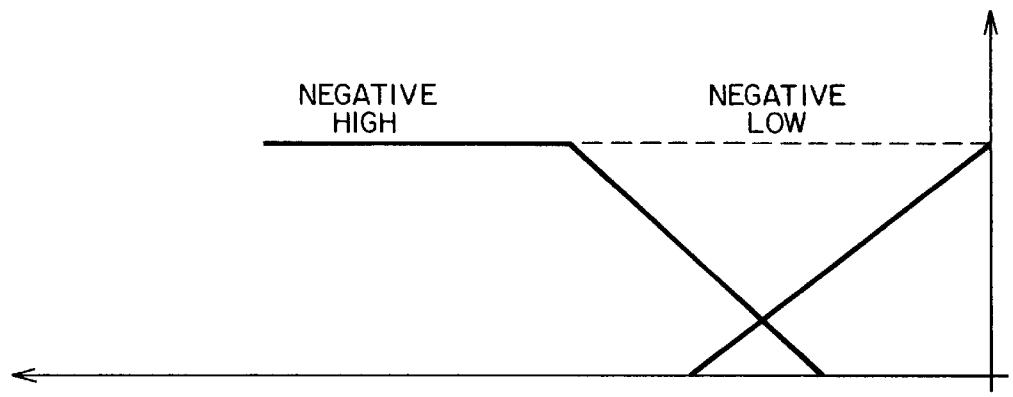
FIGS. 10A and 10B are diagrams of the fuzzy sets for the antecedents of the rules used by the fuzzy means of the fuzzy gradient corrector.
Figure 10B:
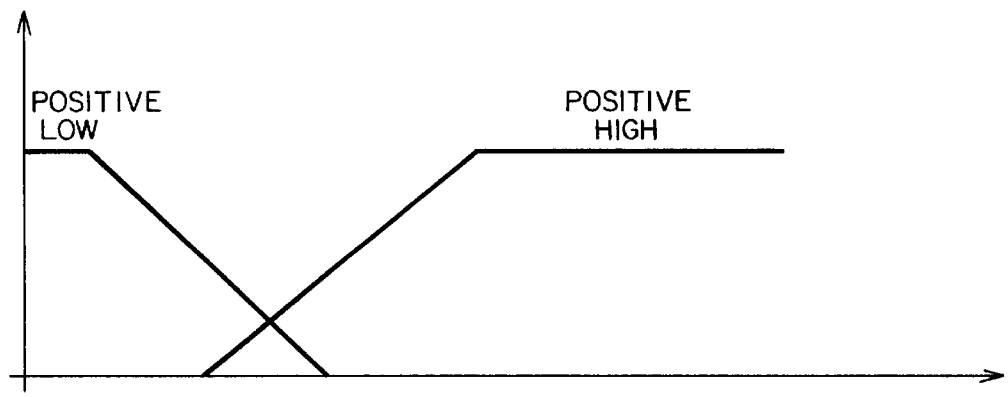

The differences Dn are used to obtain the antecedent of the fuzzy rules being applied. The Negative High, Negative Low, Positive High, and Positive Low membership functions are defined as shown in FIGS. 10A and 10B. Accordingly, there are two fuzzy sets for the positive differences and two sets for the negative differences. The input variables for each rule are the differences Dn between the central pixel and one of the neighboring pixels.

Figure 11:
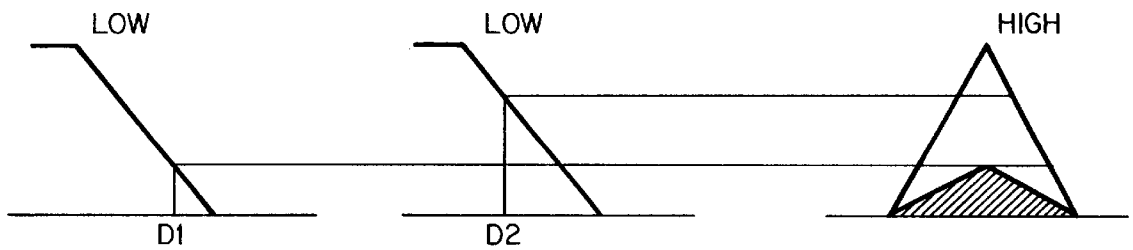
FIG. 11 shows the calculation of a rule by fuzzy means.

FIG. 11 shows how the output of a rule is determined with the MAX-DOT method. The rule can be the following:
IF D1 IS PL AND D2 IS PL THEN OUT IS HIGH The MAX-DOT method has been chosen to determine the output fuzzy set due to computational reasons. When a fixed reference system is assigned for all the fuzzy sets that are consequents of the rules, the output of the inference process is calculated by means of the formula:

$$OUT = \frac{\Sigma A_i * C_i}{\Sigma A_i}$$

where A is the area of the output fuzzy set and C is the centroid of the output fuzzy set.

The above formula can be simplified if one considers that each rule produces a triangular output fuzzy set having a constant base $b_i$ and an altitude $h_i$ that is equal to the activation level:

$$OUT = \frac{\Sigma A_i * C_i}{\Sigma A_i} = \frac{\Sigma (b_i * h_i) * C_i}{\Sigma (b_i * h_i)}$$

$$OUT = \frac{\Sigma (h_i * C_i)}{\Sigma h_i}$$

where h is the activation level of the i-th rule and $C_i$ is the centroid of the i-th output fuzzy set.

In this manner, in order to calculate the output of the fuzzy process it is sufficient to assign the centroid $C_i$ that corresponds to the output fuzzy set of the rule, avoiding the calculation of the area.

The rules that are applied are of the following kind:
IF D1 IS POSITIVE LOW AND D2 IS POSITIVE LOW THEN OUT IS HIGH
IF D1 IS POSITIVE HIGH AND D2 IS POSITIVE HIGH THEN OUT IS LOW
IF D1 IS POSITIVE LOW AND D2 IS POSITIVE HIGH THEN OUT IS MEDIUM The output of the inference process in the fuzzy means 22 is now used to correct the gradient. In the provided algorithm, the decision as to the value of the gradient F in the central pixel is reached by using a formula of the following kind:

$$F = (1 - \text{OUT}) * P + \frac{P_{Dn1} + P_{Dn2}}{2}$$

where OUT is the final output of the fuzzy rules, P is the gradient value of the central pixel, and $P_{Dn1}$ and $P_{Dn2}$ are values of the gradient of two pixels that are aligned with the central pixel and are more representative of the trend of the gradient within the mask.

Let us consider an example to clarify the operation of the algorithm. Assume a pixel configuration as in the mask shown below:

| 45 | — | — |
|----|----|----|
| — | 48 | — |
| — | — | 46 |

The Dn terms that are chosen are D1 and D8, whose values are respectively 3 and 2. By applying the fuzzy rules, one obtains a final output value OUT=0.9 which, when applied to the correction formula, produces:

$$F = (1 - 0.9) * 48 + 0.9 * \frac{(45 + 46)}{2}$$

This yields a corrected value of the gradient of the central pixel F=45.75°, rounded to 46°.

This procedure has obtained a more accurate image of the objects in the parameter plane, eliminating the relative maximums that were essentially due to the errors in the gradient.

The fuzzy gradient corrector 5 is furthermore provided with an arithmetic unit 23 adapted to calculate the radius R related to the point in a polar coordinate system by applying the previously described formula:

$$R = X \cos(F) + Y \sin(F)$$

where F is the gradient of the line being sought.

Two counters are connected to the arithmetic unit 23: a first horizontal counter 24 for generating the X coordinate, and a second vertical counter 25 for generating the Y coordinate. Both counters 24 and 25, as well as the differential block 21 and the arithmetic unit 23, are driven by a clock signal which increases the value of X of the counter 24 at each pulse and increases the value of Y of the counter 25 every 1/n clock pulses, where n is the number of columns of the image being analyzed. The division 1/n occurs by means of a divider 26 that is connected to the vertical counter 25. This establishes the position of the point within the image and determines the row and column to which the pixel of an edge belongs.

The arithmetic unit 23 then calculates the radius R related to the point in a polar coordinate system.

Figure 8:
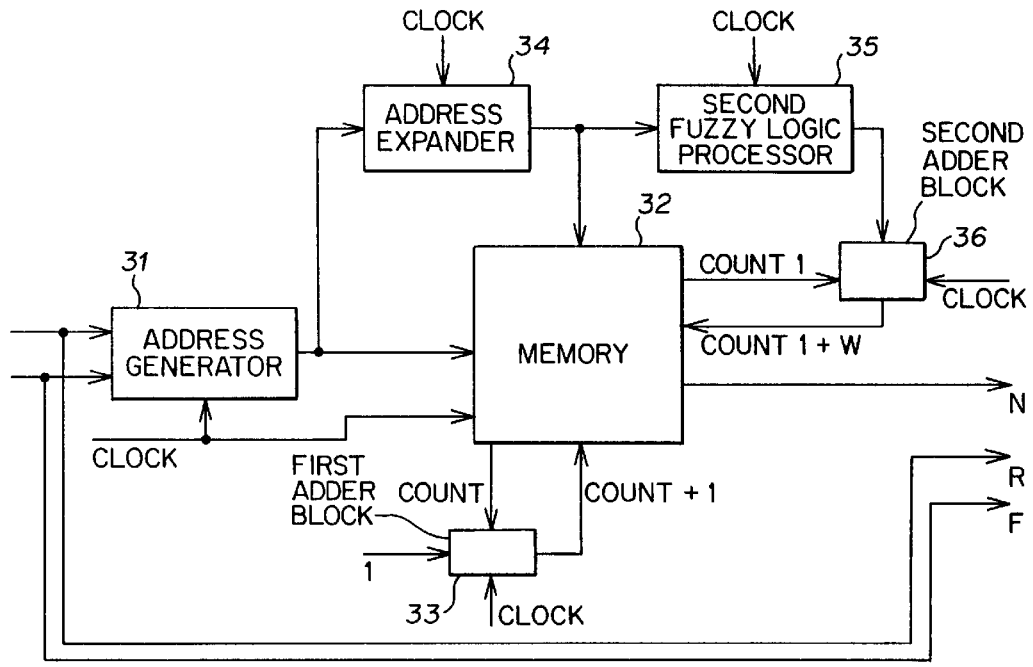
FIG. 8 is a block diagram of a fuzzy vote attributor of a device according to an embodiment of the present invention

The value of the corrected gradient F and the radius R related to the processed pixel are sent to the fuzzy vote attributor 6 shown in FIG. 8.

The fuzzy vote attributor 6 assigns an edge point to the curve to which it belongs. The parameter space comprises a memory element: the parameters that identify the curve comprise the address of a memory location that contains the number of points of the curve. Every time the parameters identify a memory location, the content of that memory location is increased by 1. At the same time, a fuzzy system determines weights to be added to other memory locations determined by an address expander.

The input parameters of the fuzzy vote attributor 6 are the corrected gradient F and the radius R. These parameters are sent to an address generator 31. Said generator is connected to a memory 32 and is capable of selecting a memory location. By means of a first adder block 33 connected to the memory 32, the content of this memory location is increased by 1 (Count).

The output of the address generator 31 is furthermore connected to an address expander 34. With respect to the address provided by the address generator 31, the address expander 34 identifies other memory locations that contain the number of the points of straight lines that are close to the one to which the point being considered belongs.

For each one of these memory locations, second fuzzy means 35 determine a weight W, comprised between 0 and 1, to be added (Count 1) by means of a second adder block 36 to the content of the memory locations identified by the address expander 34. The weight W indicates the degree of confidence assigned to the fact that the edge point might also belong to straight lines other than the one identified by the first analysis.

The output of the memory 32 is the content N of the memory locations identified by the parameters R and F. Accordingly, the output of the system comprises the parameters that identify the straight line (R and F) and by the number of points (N) that compose it.

Figure 12:
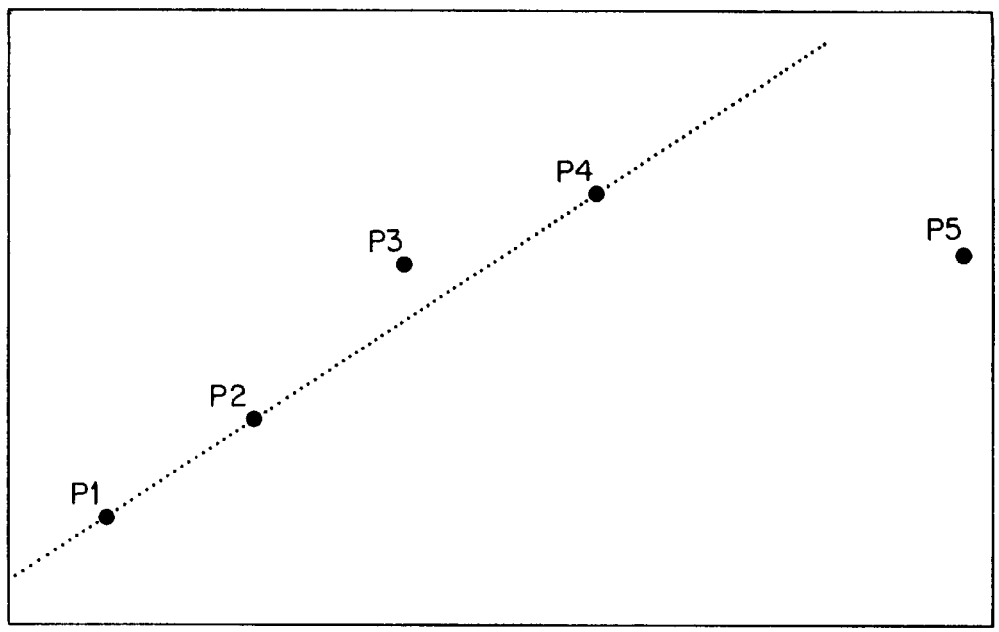
FIG. 12 is a view of an example of points that belong to a straight line.

The fuzzy analysis used in this block will be explained in greater detail. Consider the straight line and the corresponding points of FIG. 12. In a case like this, the standard Hough transform would treat points P3 and P5 in the same manner, since both would vote for a cell other than the one of the straight line represented by the dashes.

Actually, these two points must be evaluated in a completely different manner. Indeed, it is evident that the distance of the point P3 from the straight line represented by the dashes is very probably due to noise.

Since a situation of this type occurs many times in the images to be processed, it is possible to provide a fuzzy process that allows to return, when necessary, the points to the positions to which they really belong.

An attempt will be made to analyze the Hough transform from a fuzzy point of view. Consider an image that contains several points aligned along a straight line. Their transformation in the parameter plane will produce lines that intersect each other in a single point. If instead the original points lie only approximately along a straight line, their transforms will intersect only approximately in a single point. Actually, they will pass through a region around the theoretical point. The parametric lines will therefore intersect in a "fuzzy point", in that they will pass through an area around the theoretical point in a manner that can be indicated by a membership function.

In particular, it can be stated that a fuzzy point in the parameter plane represents a fuzzy straight line in the feature plane, whereas a fuzzy point in the feature plane is a fuzzy line in the parameter plane. These remarks can be demonstrated by theory. Assume that each point in the feature plane is represented by a (circular) fuzzy area centered on the original point. It is evident that the membership function relating to this area must be isotropic and have a Gaussian behavior, decreasing as it moves away from the center.

Consider, for example, a point P which is at a distance d from (x,y). This point belongs to the transform of (x,y) according to a membership function whose value is m(d). The further from (x,y), the lower the contribution.

Consider now the case of straight line recognition. The neighborhood of the point can be parameterized according to the following equations:

$$x = x_0 + r * \cos\alpha$$

$$y = y_0 + r * \sin\alpha$$

Accordingly, each point that belongs to the neighborhood being considered traces, in the parameter space, a curve of the following kind:

$$(x_0 + r * \cos\alpha) \cos\beta + (y_0 + r * \sin\alpha) \sin\beta = p$$

It is possible to obtain the envelope of all these curves at different values of $\alpha$. To achieve this, eliminate a between the previous equation and its derivative:

$$-r * \sin\alpha\cos\beta + r * \cos\alpha\sin\beta = 0$$

This produces the following expression:

$$\tan\beta = \tan\alpha \rightarrow \beta = \alpha \text{ or } \beta = \alpha + \pi$$

Replacement yields the following:

$$p = (x_0 \pm r * \cos\beta)\cos\beta + (y_0 \pm r * \sin\beta)\sin\beta = x_0\cos\beta + y_0\sin\beta$$

Figure 13:
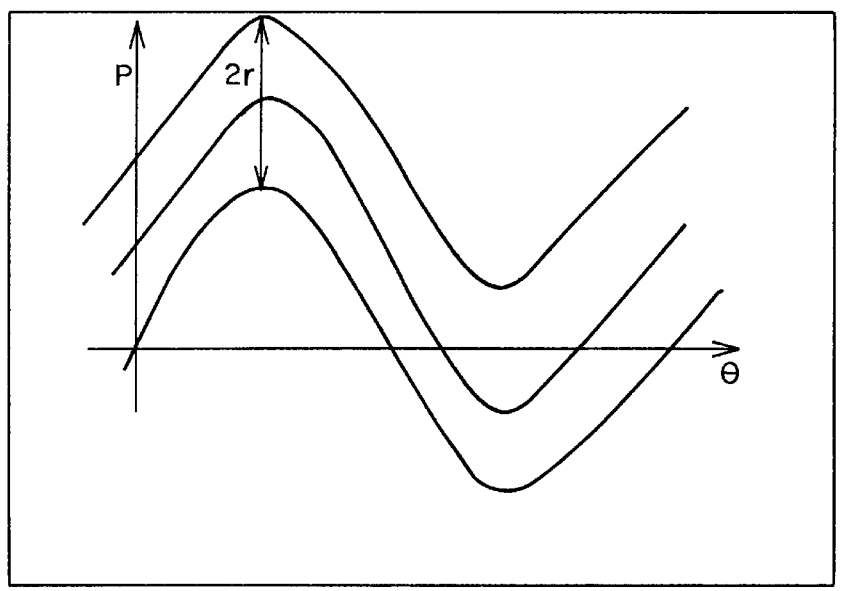
FIG. 13 is a view of a fuzzy transformation for a straight line in the parameter space, performed by the fuzzy means of the fuzzy vote attributor.

In this manner, the points of a circular neighborhood are transformed in the parameter space by translating by $\pm r$ the line produced by the transformation of its central point, as shown in FIG. 13.

It is therefore possible to project a single point as in the standard Hough transform, subsequently performing a convolution along the axis p with a membership function whose value is m(r), or taking m(r) times the contribution of each point of the circle, yielding the same result.

The invention thus conceived is susceptible of numerous modifications and variations, all of which are within the scope of the inventive concept of the present invention. Thus, for example, the pixel mask of the interfaces can also be larger, according to the requirements. Furthermore, the fuzzy means of the fuzzy vote attributor and of the gradient corrector can be provided as an on-line or off-line fuzzy processor, in which case it may be a memory element (look-up table) that contains the result of the fuzzy calculation. Although the example analyzed herein in detail is adapted for identifying straight lines, the inventive concept can be applied to other geometric shapes (curves).

Finally, all the details may be replaced with other technically equivalent ones. In practice, the materials employed, as well as the shapes and dimentions, may be according to the requirements without thereby abandoning the scope of the protection of the appended claims.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for recognizing geometric shapes in images comprising the steps of: recognizing at least one edge of a curve of an image;

recognizing a gradient of the at least one edge;

correcting the gradient using a first fuzzy logic process to determine the curve;

calculating a radius that is related to the at least one edge after the step of correcting the gradient; and determining a number of points belonging to the curve using a second fuzzy logic process;

wherein the step of determining the number of points includes steps of incrementing a value at a main memory location corresponding to the corrected gradient and the calculated radius, the value at the main memory location representing the number of points, and incrementing values at additional memory locations related to the main memory location, the step of incrementing the values at the additional memory locations including a step of assigning a respective weight by which each value is incremented for each of the additional memory locations.

2. The method of claim 1, further comprising a step of creating image portions prior to the step of recognizing at least one edge.

3. The method of claim 1, further comprising a step of selecting a portion of a gradient image generated by the step of recognizing the gradient, wherein the correcting and determining steps are applied to the selected portion.

4. The method of claim 1, further comprising a step of digitizing the image prior to the step of recognizing at least one edge.

5. The method of claim 1, wherein the step of correcting the gradient includes a step of differentiating a gradient between a central pixel of a gradient image portion and pixels surrounding the central pixel of the gradient image portion.

6. The method of claim 5, wherein the step of differentiating produces a difference and the step of correcting the gradient includes a step of processing the difference using the first fuzzy logic process to produce the corrected gradient.

7. The method of claim 1 wherein the number of points belonging to the curve is a final sum of the value at the main memory location and a sum of respective weights by which the value at the main memory location is incremented when the main memory location is one of the additional memory locations.

8. A device for recognizing geometric shapes in an image comprising:

an edge detector, which recognizes at least one edge of a line of the image and determines a gradient of the at least one edge;

a fuzzy gradient corrector receiving and correcting the gradient;

an arithmetic unit to calculate a radius of the line, the line being related to the corrected gradient; and a fuzzy vote attributor receiving the corrected gradient and determining a number of points in the image that belong to the line, wherein the fuzzy vote attributor includes a memory, and an address generator to generate a main memory location in the memory that is related to the corrected gradient and to the radius of the line.

9. The device of claim 8, further comprising a first interface to create portions of the image, an output of the first interface being connected to an input of the edge detector to provide the portions of the image to the edge detector.

10. The device of claim 8, further comprising a second interface interposed between the edge detector and the fuzzy gradient corrector to select a portion of a gradient image that is generated by the edge detector and to provide the portion of the gradient image to the fuzzy gradient corrector as the gradient.

11. The device of claim 8, wherein the fuzzy gradient corrector includes a differential block to calculate a difference between a gradient of a central pixel of the portion of the gradient image and a gradient of pixels surrounding the central pixel.

12. The device of claim 11, wherein the fuzzy gradient corrector further includes first fuzzy logic means for processing the difference and generating the corrected gradient.

13. The device of claim 8, wherein the fuzzy vote attributor further includes an address expander to identify additional memory locations that contain points of other lines close to the line associated with the main memory location.

14. The device of claim 13, wherein the fuzzy vote attributor further includes second fuzzy logic means to assign a respective weight for each one of the additional memory locations, to add each respective weight to the content of the main memory location to produce a final sum, and to output the final sum as the number of points belonging to the line.

15. The device of claim 8, further comprising an A/D converter, coupled to the edge detector, to digitize the input image and output the digitized image to the edge detector.

16. A method for recognizing geometric shapes in an image comprising the steps of:

detecting points on an edge of the image;

applying fuzzy logic to the points to determine at least one line including the points on the edge; and applying fuzzy logic to the at least one line and the points to determine a number of points belonging to the at least one line;

wherein the step of detecting points on an edge of the image includes a step of producing a plurality of sets of parameters, each set of parameters corresponding to a respective one of the points;

wherein the step of determining the number of points belonging to the at least one line includes a step of determining a number of points having similar sets of parameters:

wherein each set of parameters corresponding to a respective one of the points defines a location on the edge of the image, each set of parameters also defining a curve that is coincident to the unique location an intersection of a first curve and a second curve determining the at least one line; and wherein the step of applying fuzzy logic to the points includes a step of determining a number of curves that nearly intersect at the location.

17. The method of claim 16, further comprising, prior to the step of detecting, separating the image into a plurality of image portions.

18. The method of claim 16, wherein the step of detecting points on the edge of the image includes:

determining at least one gradient of the points on the edge of the image; and correcting the at least one gradient using fuzzy logic.

19. The method of claim 18, wherein the step of determining includes:

determining a potential gradient for each point on the edge of the image; and generating the at least one gradient based upon a comparison of the potential gradient of each point to at least one threshold value.

20. The method of claim 19, wherein the generating step includes:

generating the potential gradient as the at least one gradient when the potential gradient is greater than an upper threshold value;

discarding the potential gradient when the potential gradient is lower than a lower threshold value; and generating the potential gradient as the at least one gradient when the potential gradient is lower than the upper threshold value and greater than the lower threshold value, and a potential gradient of a neighboring point is greater than the upper threshold value.

21. The method of claim 18, wherein the step of correcting the at least one gradient using fuzzy logic includes a step of adjusting a value of a gradient of a selected point based upon a gradient value of points that are aligned with the selected point.

22. The method of claim 18, further comprising a step of determining a radius corresponding to the at least one gradient.

23. The method of claim 16, wherein the step of determining the number of points having similar sets of parameters includes:

generating a memory location corresponding to each of the points based upon the corresponding set of parameters; and incrementing a value at the memory location; and wherein the step of determining the number of points belonging to the at least one line includes the step of outputting a value at the memory location as the number of points belonging to the at least one line.

24. The method of claim 23, wherein the step of incrementing the value at the memory location includes:

incrementing the value at the memory location by a predetermined amount when the memory location is generated; and incrementing the value at the memory location by a weighted amount when the memory location has a corresponding set of parameters that is approximately equal to a set of parameters corresponding to the memory location.

25. A method for recognizing geometric shapes in an image comprising the steps of:

detecting points on an edge of the image;

applying fuzzy logic to the points to determine at least one line including the points on the edge; and applying fuzzy logic to the at least one line and the points to determine a number of points belonging to the at least one line;

wherein the step of detecting points on an edge of the image includes a step of producing a plurality of sets of parameters, each set of parameters corresponding to a respective one of the points;

wherein the step of determining the number of points belonging to the at least one line includes a step of determining a number of points having similar sets of parameters;

wherein each set of parameters corresponds to a parameter curve representing a respective one of the points on the edge; and wherein the step of determining the number of points having similar sets of parameters includes a step of applying fuzzy logic to determine a number of parameter curves intersecting at a substantially one location.

26. A device for recognizing geometric shapes in an image comprising:

an edge detector that determines points on an edge of the image and gradients of the points;

a fuzzy gradient corrector coupled to the edge detector to receive and to correct the gradients; and a fuzzy vote attributor, coupled to the fuzzy gradient corrector to receive the corrected gradients, to determine a line representing the edge and to determine a number of points that belong to the edge, the fuzzy vote attributor including a memory, an address generator generating a memory address based upon a first of the corrected gradients and a radius associated with the first corrected gradient, the unique memory address describing a point on the edge, and an address expander, the address expander receiving the first corrected gradient and the associated radius and generating additional memory addresses that are proximate to the memory address.

27. The device of claim 26, further comprising a first interface, the first interface receiving the image and splitting the image to create image portions that are provided to the edge detector for determining points on the edge.

28. The device of claim 26, further comprising a second interface coupled between the edge detector and the fuzzy gradient detector, the second interface receiving the gradients and selecting a gradient portion to provide to the fuzzy gradient corrector to be corrected.

29. The device of claim 26, wherein the fuzzy gradient corrector includes a differentiator that determines differences between a gradient of a central point and gradients of points surrounding the central point.

30. The device of claim 29, wherein the fuzzy gradient corrector further includes a first fuzzy logic device that performs fuzzy logic reasoning on the differences to produce the corrected gradient of the central point.

31. The device of claim 26, further comprising an arithmetic unit to determine radii corresponding to the gradients.

32. The device of claim 26, wherein the fuzzy vote attributor further includes a second fuzzy logic device that performs fuzzy logic reasoning on the additional memory addresses to produce a respective weight to be added to a content of each of the additional memory addresses.

33. The device of claim 32, wherein the fuzzy vote attributor further includes:

a first adder that increments a content of the memory address each time the memory address is generated; and a second adder that adds the respective weight to the content of each of the additional memory addresses, the number of points that belong to the edge being a sum of the content of the memory address and the respective weight added to the content of the memory address when the memory address is an additional memory address.

* * * * *